United States Patent
Furusho

(10) Patent No.: US 11,734,244 B2
(45) Date of Patent: Aug. 22, 2023

(54) SEARCH METHOD AND SEARCH DEVICE

(71) Applicant: ESS Holdings Co., Ltd., Chiba (JP)

(72) Inventor: Shinji Furusho, Kanagawa (JP)

(73) Assignee: ESS Holdings Co., Ltd., Chiba (JP)

( * ) Notice: Subject to any disclaimer, the term of this patent is extended or adjusted under 35 U.S.C. 154(b) by 0 days.

(21) Appl. No.: 17/815,333

(22) Filed: Jul. 27, 2022

(65) Prior Publication Data

US 2022/0365920 A1  Nov. 17, 2022

Related U.S. Application Data

(63) Continuation of application No. PCT/JP2020/004997, filed on Feb. 7, 2020.

(51) Int. Cl.
*G06F 16/22* (2019.01)
*G06F 16/9535* (2019.01)
*G06F 16/28* (2019.01)

(52) U.S. Cl.
CPC ........ *G06F 16/2264* (2019.01); *G06F 16/283* (2019.01); *G06F 16/9535* (2019.01)

(58) Field of Classification Search
CPC . G06F 16/2264; G06F 16/9535; G06F 16/283
See application file for complete search history.

(56) References Cited

U.S. PATENT DOCUMENTS 5,765,181 A * 6/1998 Oberlin ............... G06F 12/0692
            711/219
10,936,569 B1 * 3/2021 Baskaran ................ G06F 17/16
2005/0071349 A1 * 3/2005 Jordan .................. G06F 16/283
2013/0144151 A1 * 6/2013 Nolte ...................... G03H 1/08
            600/407
2015/0242505 A1 * 8/2015 Uenoyama ........... G06F 16/951
            707/722

(Continued)

FOREIGN PATENT DOCUMENTS

JP   H11-296524    10/1999
JP   2015-106347    6/2015

OTHER PUBLICATIONS

Shaohua Wan, Yu Zhao, Tian Wang, Zonghua Gu, Qammer H. Abbasi, Kim-Kwang Raymond Choo, "Multi-dimensional data indexing and range query processing via voronoi diagram for internet of things", Future Generation Computer System. vol. 91, Feb. 2019, pp. 382-391.

(Continued)

*Primary Examiner* — Eliyah S. Harper
(74) *Attorney, Agent, or Firm* — IPUSA, PLLC

(57) ABSTRACT

With respect to a search method, for execution by a computer, for searching for multidimensional data that satisfies a search condition in a table representing a multidimensional data set including a plurality of search target parameters, the search method includes creating multidimensional indexes including a plurality of transposition blocks for identifying record numbers based on values of parameters of the plurality of search target parameters by using the multidimensional data set included in the table, and identifying a target record number of the multidimensional data that satisfies the search condition in the multidimensional data set included in the table by using the multidimensional indexes.

9 Claims, 14 Drawing Sheets

(56) References Cited

U.S. PATENT DOCUMENTS

2016/0154890 A1* 6/2016 Nishimura .......... G06F 16/9535
707/770

OTHER PUBLICATIONS

Chisato Yamauchi, "Development of 2MASS Catalog Server Kit", Publications of the Astronomical Society of the Pacific, vol. 123, (2011), pp. 1324-1333.
International Search Report for PCT/JP2020/004997 dated Mar. 17, 2020.

* cited by examiner

FIG.2

| | x | y | z | m0 | m1 | m2 |
|---|---|---|---|---|---|---|
| 0 | 11 | 22 | 32 | m00 | m10 | m20 |
| 1 | 10 | 22 | 32 | m01 | m11 | m21 |
| 2 | 12 | 20 | 30 | m02 | m12 | m22 |
| 3 | 11 | 21 | 31 | m03 | m13 | m23 |
| 4 | 10 | 21 | 30 | m04 | m14 | m24 |
| 5 | 12 | 20 | 32 | m05 | m15 | m25 |
| 6 | 12 | 22 | 31 | m06 | m16 | m26 |
| 7 | 10 | 21 | 32 | m07 | m17 | m27 |
| 8 | 12 | 22 | 32 | m08 | m18 | m28 |
| 9 | 11 | 21 | 30 | m09 | m19 | m29 |
| 10 | 12 | 21 | 31 | m0a | m1a | m2a |
| 11 | 10 | 20 | 30 | m0b | m1b | m2b |

1000

MULTIDIMENSIONAL DATA (m0, m1, m2)

FIG.5

|    | x  | y  | z  |
|----|----|----|----|
| 0  | 11 | 22 | 32 |
| 1  | 10 | 22 | 32 |
| 2  | 12 | 20 | 30 |
| 3  | 11 | 21 | 31 |
| 4  | 10 | 21 | 30 |
| 5  | 12 | 20 | 32 |
| 6  | 12 | 22 | 31 |
| 7  | 10 | 21 | 32 |
| 8  | 12 | 22 | 32 |
| 9  | 11 | 21 | 30 |
| 10 | 12 | 21 | 31 |
| 11 | 10 | 20 | 30 |

1100

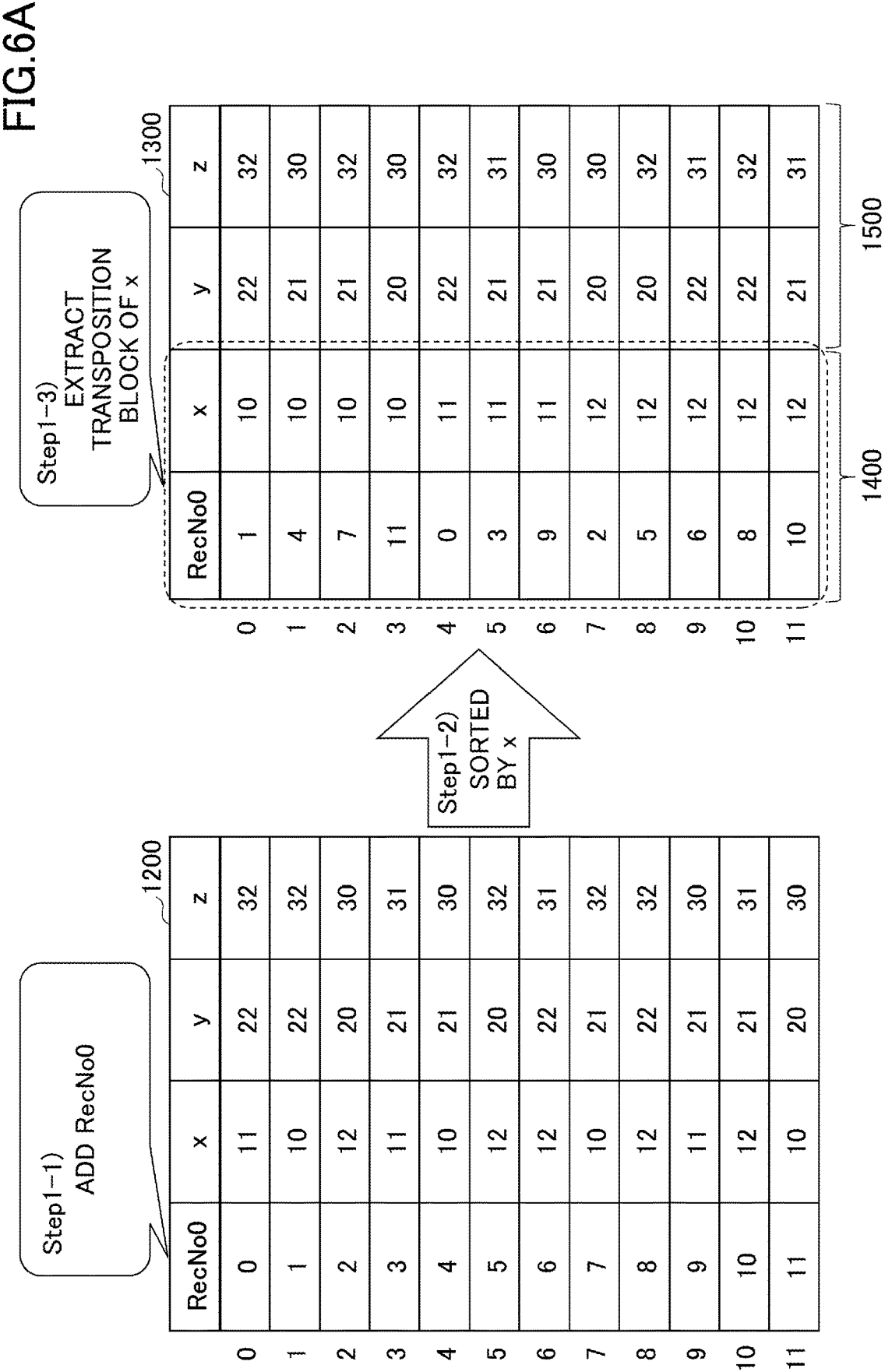

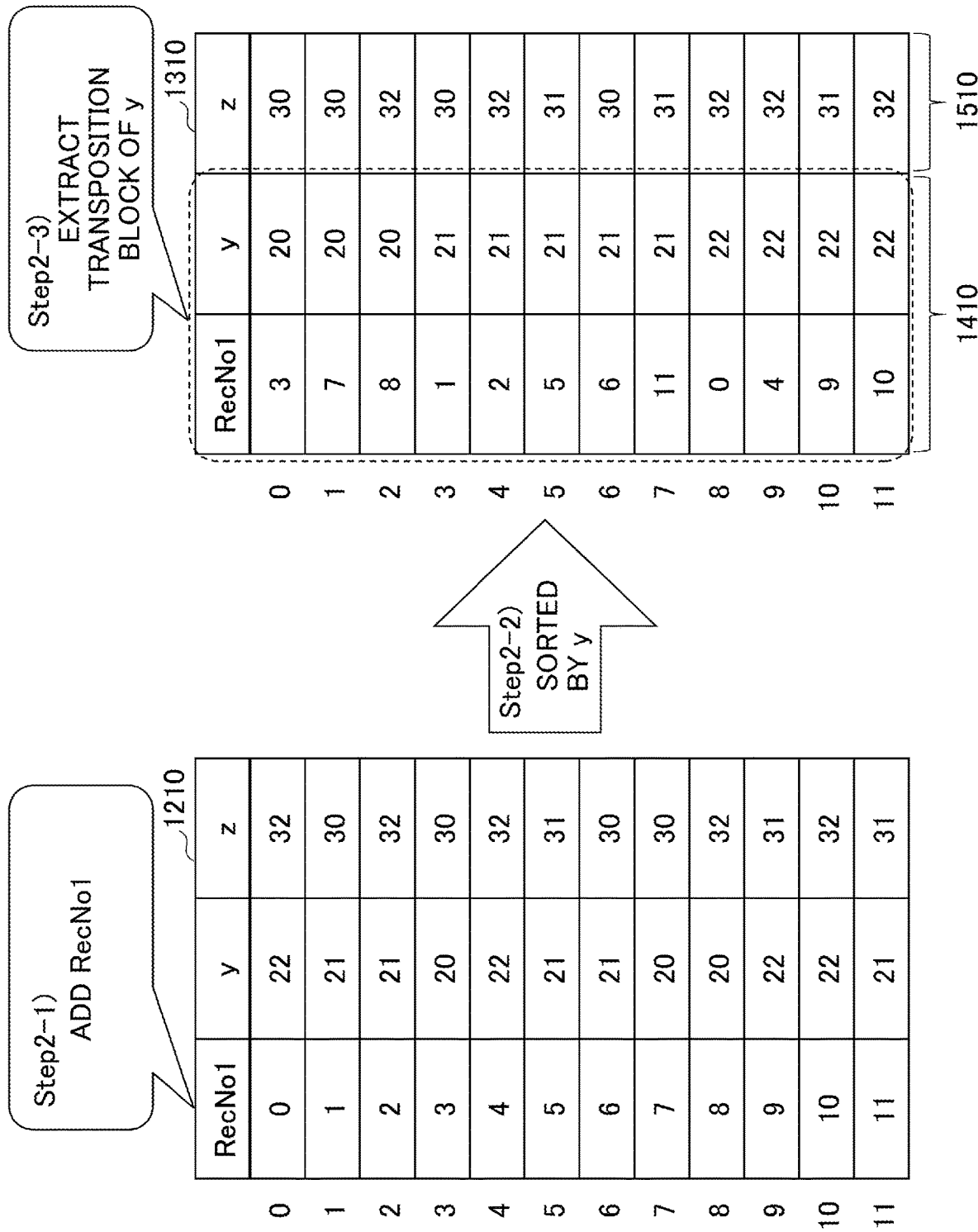

FIG.7

| | RecNo0 | x | RecNo1 | y | RecNo2 | z |
|---|---|---|---|---|---|---|
| 0 | 1 | 10 | 3 | 20 | 0 | 30 |
| 1 | 4 | 10 | 7 | 20 | 1 | 30 |
| 2 | 7 | 10 | 8 | 20 | 3 | 30 |
| 3 | 11 | 10 | 1 | 21 | 6 | 30 |
| 4 | 0 | 11 | 2 | 21 | 5 | 31 |
| 5 | 3 | 11 | 5 | 21 | 7 | 31 |
| 6 | 9 | 11 | 6 | 21 | 10 | 31 |
| 7 | 2 | 12 | 11 | 21 | 2 | 32 |
| 8 | 5 | 12 | 0 | 22 | 4 | 32 |
| 9 | 6 | 12 | 4 | 22 | 8 | 32 |
| 10 | 8 | 12 | 9 | 22 | 9 | 32 |
| 11 | 10 | 12 | 10 | 22 | 11 | 32 |

| | RecNo0 | x | RecNo1 | y | RecNo2 | z |
|---|---|---|---|---|---|---|
| 0 | 1 | 10 | 3 | 20 | 0 | 30 |
| 1 | 4 | 10 | 7 | 20 | 1 | 30 |
| 2 | 7 | 10 | 8 | 20 | 3 | 30 |
| 3 | 11 | 10 | 1 | 21 | 6 | 30 |
| 4 | 0 | 11 | 2 | 21 | 5 | 31 |
| 5 | 3 | 11 | 5 | 21 | 7 | 31 |
| 6 | 9 | 11 | 6 | 21 | 10 | 31 |
| 7 | 2 | 12 | 11 | 21 | 2 | 32 |
| 8 | 5 | 12 | 0 | 22 | 4 | 32 |
| 9 | 6 | 12 | 4 | 22 | 8 | 32 |
| 10 | 8 | 12 | 9 | 22 | 9 | 32 |
| 11 | 10 | 12 | 10 | 22 | 11 | 32 |

| | RecNo0 | x | RecNo1 | y | RecNo2 | z |
|---|---|---|---|---|---|---|
| 0 | 1 | 10 | 3 | 20 | 0 | 30 |
| 1 | 4 | 10 | 7 | 20 | 1 | 30 |
| 2 | 7 | 10 | 8 | 20 | 3 | 30 |
| 3 | 11 | 10 | 1 | 21 | 6 | 30 |
| 4 | 0 | 11 | 2 | 21 | 5 | 31 |
| 5 | 3 | 11 | 5 | 21 | 7 | 31 |
| 6 | 9 | 11 | 6 | 21 | 10 | 31 |
| 7 | 2 | 12 | 11 | 22 | 2 | 32 |
| 8 | 5 | 12 | 0 | 22 | 4 | 32 |
| 9 | 6 | 12 | 4 | 22 | 8 | 32 |
| 10 | 8 | 12 | 9 | 22 | 9 | 32 |
| 11 | 10 | 12 | 10 | 22 | 11 | 32 |

2600

| | Planet | x | y | z | ... |
|---|---|---|---|---|---|
| 0 | Venus | 11 | 22 | 32 | ... |
| 1 | Venus | 10 | 22 | 32 | ... |
| 2 | Venus | 12 | 20 | 30 | ... |
| 3 | Venus | 11 | 21 | 31 | ... |
| 4 | Venus | 10 | 21 | 30 | ... |
| 5 | Venus | 12 | 20 | 32 | ... |
| 6 | Venus | 12 | 22 | 31 | ... |
| 7 | Venus | 10 | 21 | 32 | ... |
| 8 | Venus | 12 | 22 | 32 | ... |
| 9 | Venus | 11 | 21 | 30 | ... |
| 10 | Venus | 12 | 21 | 31 | ... |
| 11 | Venus | 10 | 20 | 30 | ... |

Table 2110:

| | Planet | x | y | z | ... |
|---|---|---|---|---|---|
| 0 | Mars | 12 | 20 | 33 | ... |
| 1 | Mars | 13 | 23 | 30 | ... |
| 2 | Mars | 11 | 20 | 31 | ... |
| 3 | Mars | 12 | 21 | 32 | ... |
| 4 | Mars | 10 | 22 | 30 | ... |
| 5 | Mars | 10 | 21 | 33 | ... |
| 6 | Mars | 13 | 22 | 33 | ... |
| 7 | Mars | 10 | 23 | 31 | ... |
| 8 | Mars | 11 | 20 | 30 | ... |
| 9 | Mars | 12 | 22 | 32 | ... |
| 10 | Mars | 11 | 23 | 33 | ... |
| 11 | Mars | 13 | 21 | 31 | ... |

Table 2610:

| | RecNo0 | x | RecNo1 | y | RecNo2 | z |
|---|---|---|---|---|---|---|
| 0 | 4 | 10 | 3 | 20 | 1 | 30 |
| 1 | 5 | 10 | 4 | 20 | 6 | 30 |
| 2 | 7 | 10 | 6 | 20 | 11 | 30 |
| 3 | 2 | 11 | 1 | 21 | 0 | 31 |
| 4 | 8 | 11 | 7 | 21 | 5 | 31 |
| 5 | 10 | 11 | 11 | 21 | 9 | 31 |
| 6 | 0 | 12 | 0 | 22 | 4 | 32 |
| 7 | 3 | 12 | 8 | 22 | 7 | 32 |
| 8 | 9 | 12 | 10 | 22 | 2 | 33 |
| 9 | 1 | 13 | 2 | 23 | 3 | 33 |
| 10 | 6 | 13 | 5 | 23 | 8 | 33 |
| 11 | 11 | 13 | 9 | 23 | 10 | 33 |

FIG.10C

| | Planet | x | y | z | ... |
|---|---|---|---|---|---|
| 0 | Venus | 11 | 22 | 32 | ... |
| ... | ... | ... | ... | ... | ... |
| 11 | Venus | 10 | 20 | 30 | ... |
| 12 | Mars | 12 | 20 | 33 | ... |
| 13 | Mars | 13 | 23 | 30 | ... |
| 14 | Mars | 11 | 20 | 31 | ... |
| 15 | Mars | 12 | 21 | 32 | ... |
| 16 | Mars | 10 | 22 | 30 | ... |
| 17 | Mars | 10 | 21 | 33 | ... |
| 18 | Mars | 13 | 22 | 33 | ... |
| 19 | Mars | 10 | 23 | 31 | ... |
| 20 | Mars | 11 | 20 | 30 | ... |
| 21 | Mars | 12 | 22 | 32 | ... |
| 22 | Mars | 11 | 23 | 33 | ... |
| 23 | Mars | 13 | 21 | 31 | ... |

3100

| | RecNo0 | x | RecNo1 | y | RecNo2 | z |
|---|---|---|---|---|---|---|
| 0 | 1 | 10 | 3 | 20 | 0 | 30 |
| ... | ... | ... | ... | ... | ... | ... |
| 11 | 10 | 12 | 10 | 22 | 11 | 32 |
| 12 | 16 | 10 | 15 | 20 | 13 | 30 |
| 13 | 17 | 10 | 16 | 20 | 18 | 30 |
| 14 | 19 | 11 | 18 | 20 | 23 | 30 |
| 15 | 14 | 11 | 13 | 21 | 12 | 31 |
| 16 | 20 | 12 | 19 | 21 | 17 | 31 |
| 17 | 22 | 12 | 23 | 21 | 21 | 31 |
| 18 | 12 | 13 | 12 | 22 | 16 | 32 |
| 19 | 15 | 13 | 20 | 22 | 19 | 32 |
| 20 | 21 | 13 | 22 | 23 | 14 | 33 |
| 21 | 13 | 13 | 14 | 23 | 15 | 33 |
| 22 | 18 | 13 | 17 | 23 | 20 | 33 |
| 23 | 23 | 13 | 21 | 23 | 22 | 33 |

3600

SEARCH METHOD AND SEARCH DEVICE

CROSS-REFERENCE TO RELATED APPLICATIONS

This application is a continuation application of International Application No. PCT/JP2020/004997 filed on Feb. 7, 2020, and designating the U.S., the entire contents of which are incorporated herein by reference.

BACKGROUND

1. Technical Field

The present disclosure relates to a search method and a search device.

2. Description of the Related Art

There is need for services to retrieve and provide necessary portions of a group of an extremely large number of data (e.g., big data such as observational data used in scientific computation). The data group to be searched in such a service is a set of multidimensional data, and a multidimensional range is often specified as a search condition. Additionally, non-numeric values, such as character strings, may be mixed in the search condition. An example of such a case is, when n is a name of an object to be observed and (x, y, z) is spatial coordinates around the object to be observed, searching for observation data that satisfies a condition that n="observation name A" and $X_1 \leq x \leq X_2$, $Y_1 \leq y \leq Y_2$, and $Z_1 \leq z \leq Z_2$.

However, in the related art, a multidimensional data set to be searched by the services described above cannot be efficiently searched.

For example, in existing indexing techniques, an index is generated based on a magnitude relationship of values (i.e., one-dimensional magnitude relationship) and the multidimensional data set cannot be efficiently searched. Additionally, for example, a technique for mapping a multidimensional space into a space of less dimensions and searching the multidimensional data set in the space of less dimensions is known, but when non-numerical values such as character strings are mixed, the multidimensional space cannot be mapped to the space of less dimensions. Additionally, for example, a technique for searching a multidimensional data set by using a hash function is known, but when a search condition is specified by a multidimensional range, a hash function cannot be used.

One embodiment of the present disclosure has been made in the above-described view, and it is desired to efficiently search a multidimensional data set.

RELATED ART DOCUMENT

Non-Patent Document

[Non-Patent Document 1] Shaohua Wan, Yu Zhao, Tian Wang, Zonghua Gu, Qammer H. Abbasi, Kim-Kwang Raymond Choo, "Multi-dimensional data indexing and range query processing via voronoi diagram for internet of things", Future Generation Computer System. Volume 91, February 2019, Pages 382-391

[Non-Patent Document 2] Chisato Yamauchi, "Development of 2MASS Catalog Server Kit", Publications of the Astronomical Society of the Pacific, Volume 123, (2011), pp. 1324-1333

SUMMARY

According to one aspect of the present disclosure, with respect to a search method, for execution by a computer, for searching for multidimensional data that satisfies a search condition in a table representing a multidimensional data set including a plurality of search target parameters, the search method includes creating multidimensional indexes including a plurality of transposition blocks for identifying record numbers based on values of parameters of the plurality of search target parameters by using the multidimensional data set included in the table, and identifying a target record number of the multidimensional data that satisfies the search condition in the multidimensional data set included in the table by using the multidimensional indexes.

At least one embodiment of the present disclosure, multidimensional data can be efficiently searched.

BRIEF DESCRIPTION OF THE DRAWINGS

FIG. 2 is a drawing illustrating an example of a table stored in a database;

FIG. 5 is a drawing illustrating an example of a multidimensional index creation table;

FIG. 6A is a drawing depicting an example of creating a transposition block;

FIG. 6B is a drawing depicting an example of creating a transposition block;

FIG. 7 is a drawing illustrating an example of a multidimensional index;

FIG. 9 is a drawing depicting an example of a closed interval that satisfies a search condition;

FIG. 10A is a drawing depicting an example of partitioning;

FIG. 10B is a drawing depicting an example of partitioning; and

FIG. 10C is a drawing depicting an example of partitioning.

DETAILED DESCRIPTION

In the following, one embodiment of the present disclosure will be described. In the present embodiment, a data search system 1 that can efficiently (i.e., with small memory and fast) search for desired multidimensional data from a significantly large set of multidimensional data is described. The multidimensional data refers to data in which at least a parameter specified in a search condition (hereinafter referred to as the "search target parameter") is multidimensional. That is, the multidimensional data indicates data in which search target parameters are represented by N (where N is an integer of 2 or greater) parameters $(x_0, x_1, \ldots, x_{N-1})$. Here, each target parameter $x_i$ ($i=0, 1, \ldots, N-1$) takes any value (e.g., a numeric value, a character string, and the like) for which an order relation can be defined.

In the present embodiment, for example, a case, in which, when N=3, $x_0$=x, $x_1$=y, and $x_2$=z are used, will be described.

Overall Configuration

Figure 1:
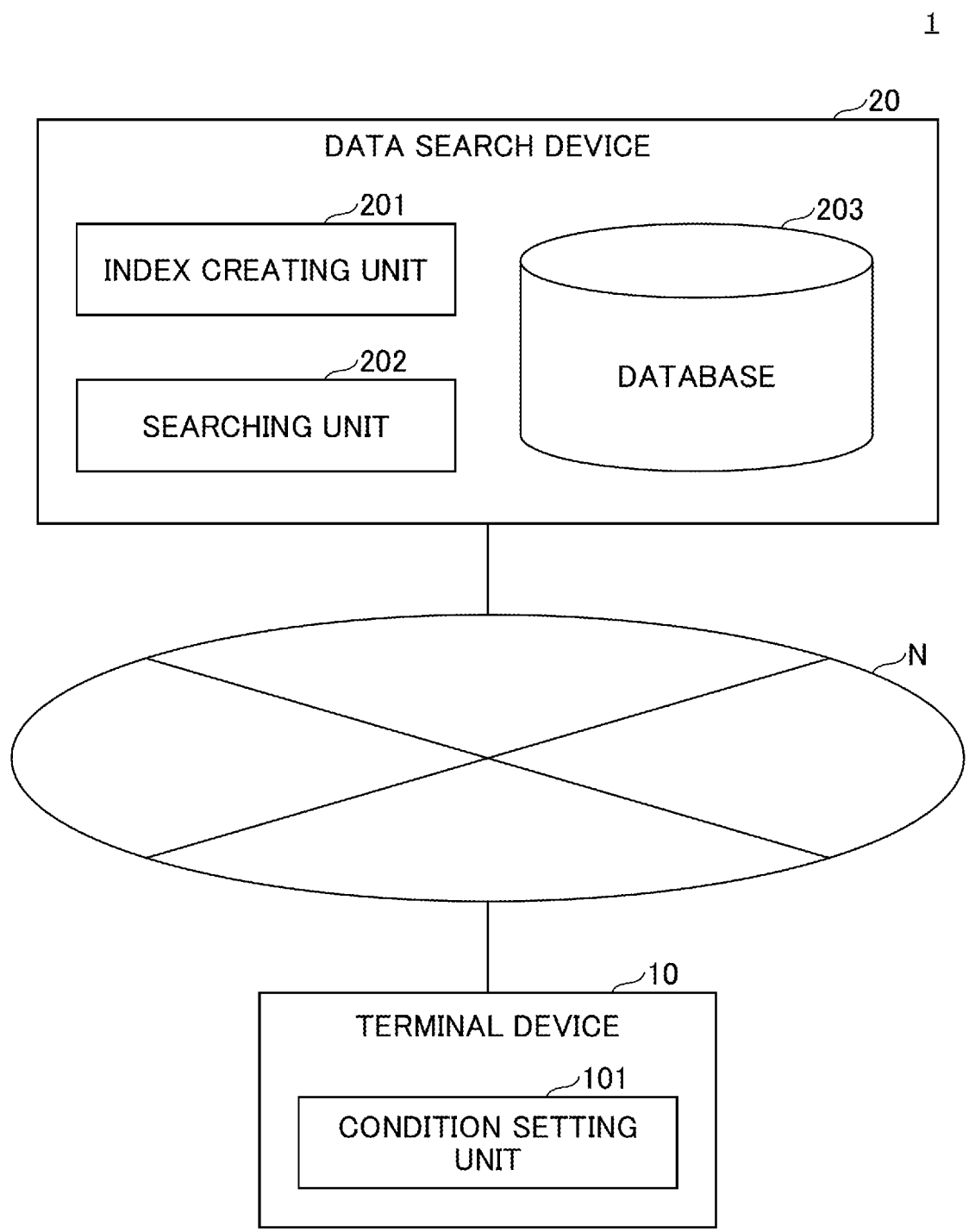
FIG. 1 is a drawing illustrating an example of an overall configuration of a data search system according to the present embodiment.

First, an overall configuration of the data search system 1 according to the present embodiment will be described with reference to FIG. 1. FIG. 1 is a drawing illustrating an example of the overall configuration of the data search system 1 according to the present embodiment.

As illustrated in FIG. 1, the data search system 1 according to the present embodiment includes a terminal device 10 and a data search device 20. Additionally, the terminal device 10 and the data search device 20 are communicatively connected to each other through a communication network N.

The terminal device 10 is an information processing device (a computer) such as a PC operated by a user who uses desired multidimensional data retrieved from a significantly large number of multidimensional data. The user can operate the terminal device 10 to search and display data managed by the data search device 20.

The terminal device 10 includes a condition setting unit 101 that sets a search condition used when searching multidimensional data managed by the data search device 20. The condition setting unit 101 is implemented, for example, by processing that one or more programs installed in the terminal device 10 causes a central processing unit (CPU) to execute. Here, the terminal device 10 is not limited to a PC, and may be, for example, various information processing devices, such as a smartphone, a tablet terminal, or the like.

The data search device 20 is an information processing device (a computer) such as a database server managed by a multidimensional data provider.

The data search device 20 includes an index creating unit 201 that creates a multidimensional index that is an index for searching for multidimensional data, a searching unit 202 that searching for multidimensional data that satisfies the search condition by using the multidimensional index, and a database 203 in which a table 1000 including a large number of multidimensional data are stored. The index creating unit 201 and the searching unit 202 are implemented, for example, by processing that one or more programs installed in the data search device 20 causes a CPU to execute. Additionally, the database 203 can be implemented, for example, by an auxiliary storage device, such as a hard disk drive (HDD), a solid state drive (SSD), or the like.

Here, the configuration of the data search system 1 illustrated in FIG. 1 is an example and another configuration may be used. For example, the data search system 1 may include multiple terminal devices 10 and multiple data search devices 20. Additionally, the database 203 included in the data search device 20 may be implemented by, for example, a network attached storage (NAS).

Table 1000 Stored in the Database 203

Here, the table 1000 stored in the database 203 will be described with reference to FIG. 2. FIG. 2 is a drawing illustrating an example of the table 1000 stored in the database 203.

As illustrated in FIG. 2, the table 1000 includes multiple multidimensional data (i.e., multiple records). Additionally, each multidimensional data includes multiple parameters including the search target parameters. In the example illustrated in FIG. 2, each multidimensional data includes six parameters (x, y, z, m0, m1, m2). Among these six parameters, x, y, and z are the search target parameters. Here, the parameters m0, m1, and m3 are not to be searched, and are, for example, parameters taking observation values used in the scientific calculation. However, among the parameters included in the multidimensional data, which parameter is the search target parameter may differ depending on the type of multidimensional data and the purpose of the user using the multidimensional data.

Additionally, a record number indicating the position in the table 1000 is provided to each multidimensional data. For example, a record number of 0 is provided to multidimensional data (x, y, z, m0, m1, m2)=(11, 22, 32, m00, m10, m20). Similarly, a record number of 1 is provided to multidimensional data (x, y, z, m0, m1, m2)=(10, 22, 32, m01, m11, m21). The same applies to other multidimensional data. Hereinafter, the table 1000 is also referred to as the "source table 1000".

Hardware Configuration

Figure 3:
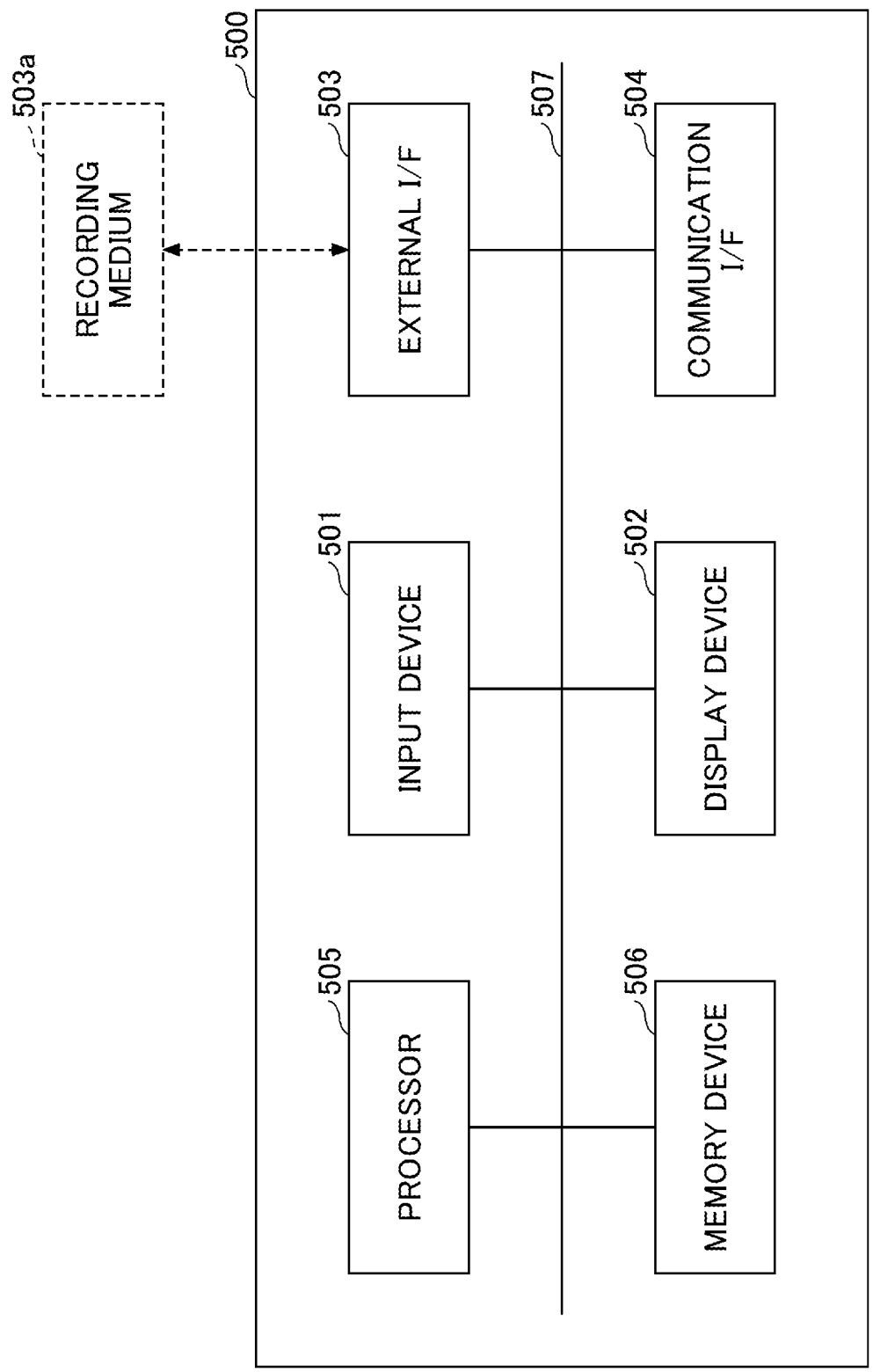
FIG. 3 is a drawing illustrating an example of a hardware configuration of a computer.

Next, a hardware configuration of one or more computers implementing the terminal device 10 and the data search device 20 according to the present embodiment will be described with reference to FIG. 3. FIG. 3 is a drawing illustrating an example of the hardware configuration of a computer 500.

The computer 500 illustrated in FIG. 3 includes an input device 501, a display device 502, an external I/F 503, a communication I/F 504, a processor 505, and a memory device 506. Respective hardware components are communicatively connected via a bus 507.

The input device 501 is, for example, a keyboard, a mouse, a touch panel, or the like. The display device 502 is, for example, a display or the like. The data search device 20 need not include one or both of the input device 501 and the display device 502.

The external I/F 503 is an interface with an external device. The external device include, for example, a recording medium 503a or the like. The terminal device 10 and the data search device 20 can read data from or write data to the recording medium 503a through the external I/F 503.

Examples of the recording medium 503a include a flexible disk, a compact disc (CD), a digital versatile disk (DVD), a secure digital memory card (SD memory card), a universal serial bus (USB) memory card, and the like.

The communication I/F 504 is an interface for connecting the terminal device 10 and the data search device 20 to the communication network N. The terminal device 10 and the data search device 20 can communicate data with another device or equipment through the communication I/F 504.

The processor 505 is, for example, various arithmetic devices, such as a CPU or a graphics processing unit (GPU). The memory device 506 is, for example, various storage devices, such as a random access memory (RAM), a read only memory (ROM), an HDD, an SSD, a flash memory, and the like.

The terminal device 10 and the data search device 20 according to the present embodiment can achieve various processing described later by using the hardware configuration of the computer 500 illustrated in FIG. 3. Here, the hardware configuration of the computer 500 illustrated in FIG. 3 is an example, and another hardware configuration may be used. For example, the computer 500 illustrated in FIG. 3 may include multiple processors 505 and may include multiple memory devices 506.

Multidimensional Index Creation Process

Figure 4:
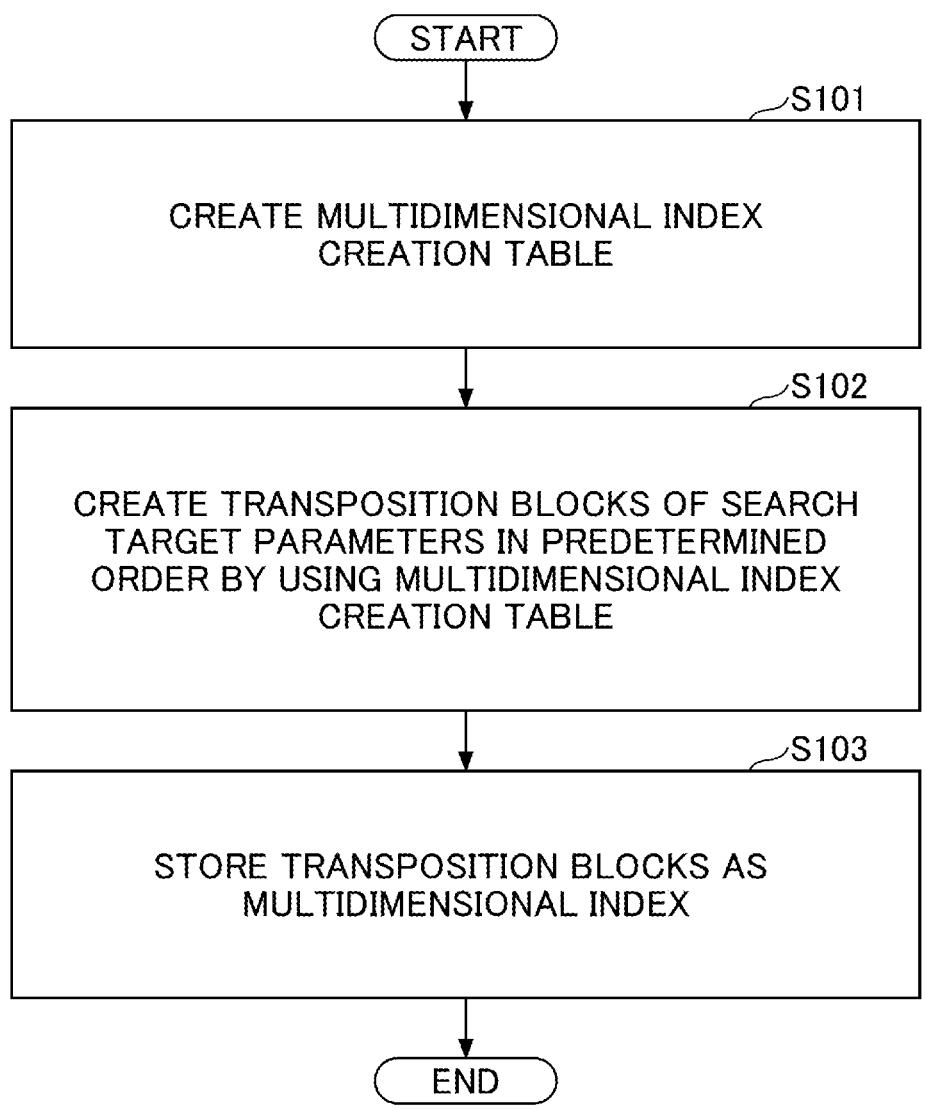
FIG. 4 is a flowchart illustrating an example of a multidimensional index creation process according to the present embodiment.

Next, a multidimensional index creation process for creating a multidimensional index that is used to search for multidimensional data that satisfies a search condition from among the multidimensional data constituting the source table 1000 stored in the database 203 will be described with reference to FIG. 4. FIG. 4 is a flowchart illustrating an example of the multidimensional index creation process according to the present embodiment. The following description assumes that the source table 1000 illustrated in FIG. 2 is stored in the database 203, as an example.

First, in step S101, the index creating unit 201 of the data search device 20 creates a multidimensional index creation table 1100 illustrated in FIG. 5 by extracting the search target parameters from the multidimensional data constituting the source table 1000 illustrated in FIG. 2. As illustrated in FIG. 5, the multidimensional index creation table 1100 includes data (records) obtained by extracting the search target parameters from the multidimensional data constituting the source table 1000 illustrated in FIG. 2.

Next, in step S102, the index creating unit 201 of the data search device 20 creates transposition blocks of the search target parameters in a predetermined order by using the multidimensional index creation table 1100. Here, the predetermined order is a predetermined order of the search target parameters. Any order can be used for the predetermined order. In the following, a case, in which the transposition blocks of the search target parameters are created in the order x, y, and z, will be described, as an example.

Step 1-1: As illustrated in FIG. 6A, the index creating unit 201 adds "RecNo0" to respective records constituting the multidimensional index creation table 1100 to create a table 1200. At this time, the record numbers of the records constituting the multidimensional index creation table 1100 are stored in corresponding cells of RecNo0.

Step 1-2: Next, as illustrated in FIG. 6A, the index creating unit 201 sorts the records constituting the table 1200 by the search target parameter x to create a table 1300.

Here, in the example illustrated in FIG. 6A, the values of the search target parameter x are sorted in ascending order, but the values of the search target parameter x may be sorted in descending order. Additionally, in the example illustrated in FIG. 6A, the positions (record numbers) of the respective records are replaced by sorting by the search target parameter x, but the positions of the records are not necessarily required to change, as long as each record can be accessed in the sorting order of the search target parameter x. For example, each record may be accessed in the sorting order of the search parameters x by using existing indexing techniques without replacing the positions of the records.

Step 1-3: As illustrated in FIG. 6A, the index creating unit 201 extracts RecNo0 and the search target parameter x from the respective records constituting the table 1300 to create a transposition block 1400 of x. Additionally, the index creating unit 201 extracts remaining search target parameters (that is, the search target parameters y and z) from the respective records constituting the table 1300 to create a table 1500.

Step 2-1: As illustrated in FIG. 6B, the index creating unit 201 adds RecNo1 to the respective records constituting the table 1500 to create a table 1210. At this time, the record numbers of the respective records constituting the table 1500 are stored in corresponding cells of RecNo1.

Step 2-2: As illustrated in FIG. 6B, the index creating unit 201 sorts the records constituting the table 1210 by the search target parameter y to create a table 1310.

Here, in the example illustrated in FIG. 6B, the values of the search target parameter y are sorted in ascending order, but the values of the search target parameter y may be sorted in descending order. Additionally, in the example illustrated in FIG. 6B, the positions (record numbers) of the respective records are replaced by sorting by the search target parameter y, but the positions of the records are not necessarily required to change, as long as each record can be accessed in the sorting order of the search target parameter y. For example, each record may be accessed in the sorting order of the search target parameter y by using existing indexing techniques without replacing the positions of the records.

Step 2-3: As illustrated in FIG. 6B, the index creating unit 201 extracts RecNo1 and the search target parameter y from the respective records constituting the table 1310 to create a transposition block 1410 of y. Additionally, the index creating unit 201 extracts a remaining search target parameter (that is, a search target parameter z) from the respective records constituting the table 1310 to create a table 1510.

Figure 6C:
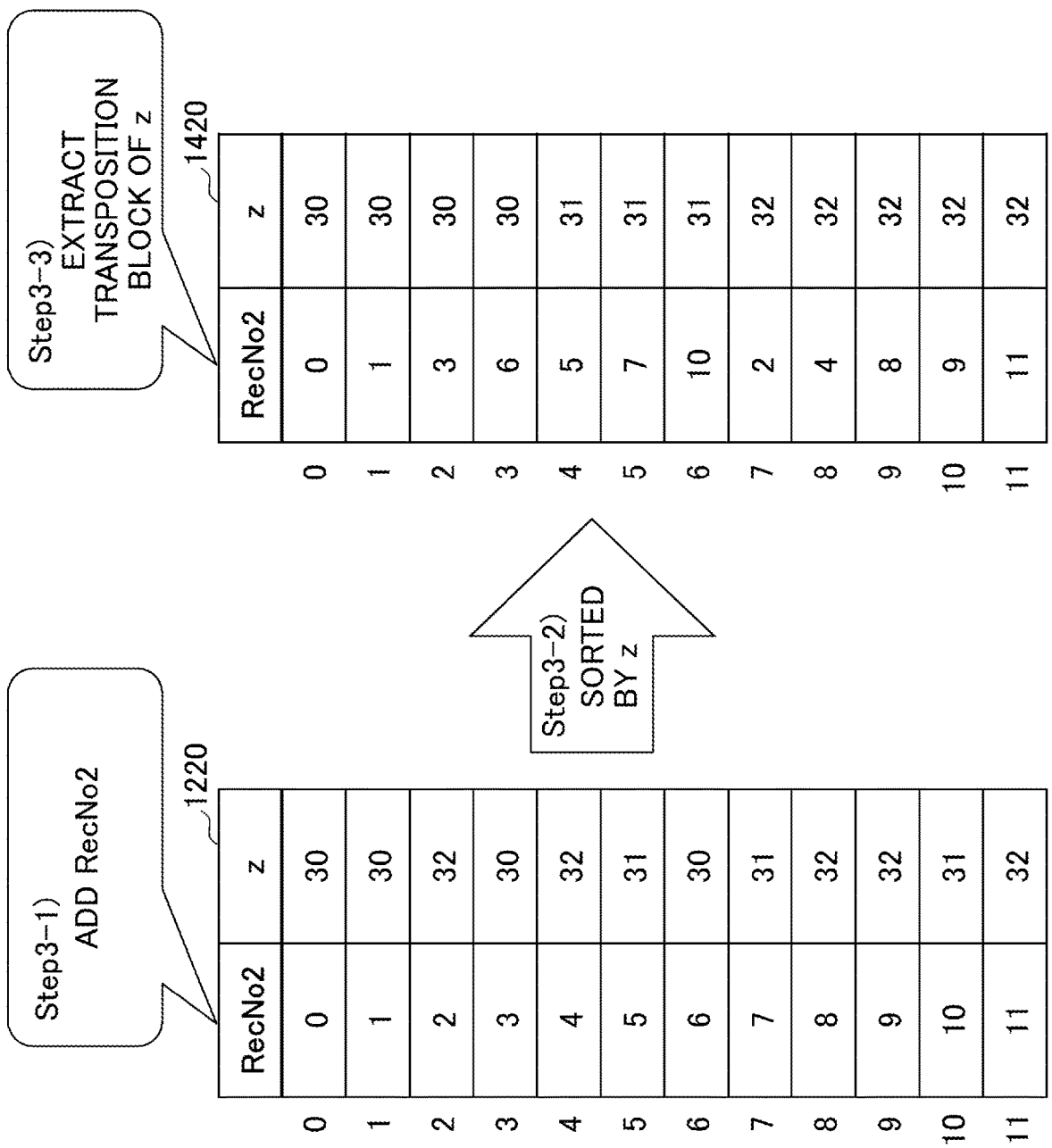
FIG. 6C is a drawing depicting an example of creating a transposition block.

Step 3-1: As illustrated in FIG. 6C, the index creating unit 201 adds RecNo2 to the respective records constituting the table 1510 to create a table 1220. At this time, the record numbers of the respective records constituting the table 1510 are stored in corresponding cells of RecNo2.

Step 3-2: As illustrated in FIG. 6C, the index creating unit 201 sorts the records constituting the table 1220 by the search target parameter z to create a table 1420.

In the example illustrated in FIG. 6C, the values of the search target parameter z are sorted in ascending order, but the values of the search target parameter z may be sorted in descending order. Additionally, in the example illustrated in FIG. 6C, the positions (record numbers) of the respective records are replaced by sorting by the search target parameter z, but the positions of the records are not necessarily required to change, as long as each record can be accessed in the sorting order of the search target parameter z. For example, each record may be accessed in the sorting order of the search parameter z by using existing indexing techniques without replacing the positions of the records.

Step 3-3: As illustrated in FIG. 6C, the index creating unit 201 uses the table 1420 as a transposition block 1420 of z.

Returning to FIG. 4, in step S103, following step S102, the index creating unit 201 of the data search device 20 stores the transposition blocks 1400 to 1420 created in step S102 in the database 203 as a multidimensional index 1600. Here, the multidimensional index 1600 is illustrated in FIG. 7. As illustrated in FIG. 7, the multidimensional index 1600 includes the transposition block 1400 of the search target parameter x, the transposition block 1410 of the search target parameter y, and the transposition block 1420 of the search target parameter z.

The multidimensional index 1600 created as described above has the following first and second properties.

First property: The record number of the source table 1000 can be identified from the record number of the transposition block by reversing the predetermined order.

For example, RecNo0, RecNo1, and RecNo2 are regarded as one-dimensional arrays, and i is the index of the one-dimensional array RecNo2. In the example illustrated in FIG. 7, RecNo2[0]=0, RecNo2[1]=1, RecNo2[2]=3, . . . , RecNo2[10]=9, RecNo2[11]=11 are indicated.

At this time, according to the method of creating the transposition block 1420 of the search target parameter z, RecNo2[i] gives the record number of the transposition block 1410 of the search target parameter y. Similarly, according to the method of creating the transposition block 1410 of the search target parameter y, RecNo1[RecNo2[i]] gives the record number of the transposition block 1400 of the search target parameter x. Similarly, according to the method of creating the transposition block 1400 of the search target parameter x, RecNo0[RecNo1[RecNo2[i]]] gives the record number of the source table 1000.

Therefore, when the record number i of the transposition block 1420 of the search target parameter z is given, the record number of the source table 1000 can be identified by RecNo0[RecNo1[RecNo2[i]]].

Second property: Because the values of the search target parameter are sorted, when the range of the values of the search target parameter is given, the range of the record numbers of each transposition block can be identified.

For example, when 10≤x≤11 is given, the range of the record numbers of the transposition block 1400 illustrated in FIG. 7 is a closed interval [0, 6]. Similarly, when 21≤y≤22 is given, the range of the record number of the transposition block 1410 illustrated in FIG. 7 is a closed interval [3, 11]. Similarly, when 31≤z≤32 is given, the range of the record numbers of the transposition block 1420 illustrated in FIG. 7 is a closed interval [4,11].

Search Process

Figure 8:
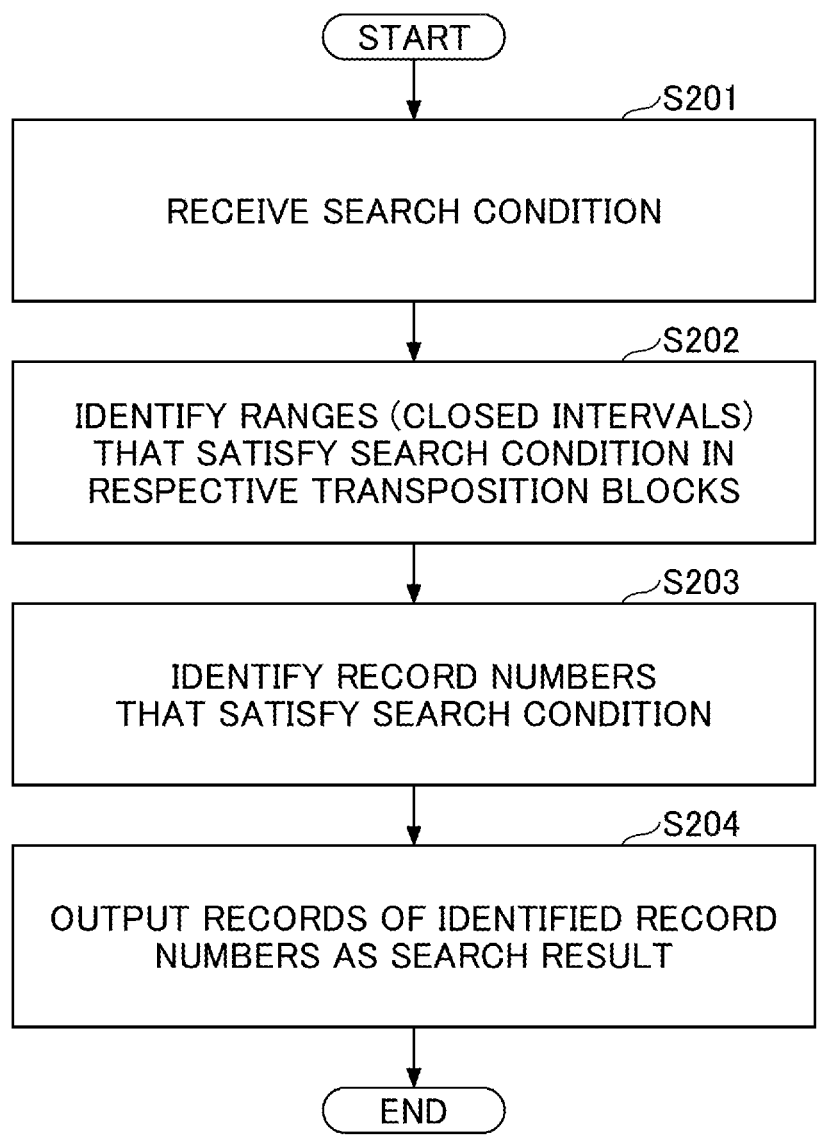
FIG. 8 is a flowchart illustrating an example of a search process according to the present embodiment.

Next, a search process for, when a search condition is given, searching for multidimensional data that satisfies the search condition by using the multidimensional index 1600 will be described with reference to FIG. 8. FIG. 8 is a flowchart illustrating an example of the search process according to the present embodiment. The following description assumes that the search condition "10≤x≤11, and, 21≤y≤22, and, 31≤z≤32" is set by the condition setting unit 101 of the terminal device 10, as an example. Here, "and" indicates the "and" condition.

First, in step S201, the searching unit 202 of the data search device 20 receives the search condition "10≤x≤11, and, 21≤y≤22, and, 31≤z≤32" set in the condition setting unit 101 of the terminal device 10.

Next, in step S202, the searching unit 202 of the data search device 20 identifies closed intervals that satisfy the search condition in the respective transposition blocks constituting the multidimensional index 1600 by utilizing the above-described second property. That is, as illustrated in FIG. 9, the searching unit 202 identifies a closed interval $S_0$=[0, 6] that satisfies the search condition 10≤x≤11, a closed interval $S_1$=[3, 11] that satisfies the search condition 21≤y≤22, and a closed interval $S_2$=[4, 11] that satisfies the search condition 31≤z≤32.

Next, in step S203, the searching unit 202 of the data search device 20 identifies the record number of the multidimensional data data that satisfies the search condition among the record numbers of the source table 1000 by using the above-described first property. The searching unit 202 identifies the record number of the multidimensional data that satisfies the search condition according to the following step 4-1 to step 6-2.

Step 4-1: First, the searching unit 202 extracts RecNo2{5, 7, 10, 2, 4, 8, 9, 11} of the records within the closed interval $S_2$=[4, 11] of the transposition block 1420 of the search target parameter z.

Step 4-2: Because the values of RecNo2 extracted in step 4-1 is the record numbers of the transposition block 1410 of the search target parameter y, the searching unit 202 excludes the values that are not included in the closed interval $S_1$=[3, 11] among these RecNo2 values. By this process, RecNo2{5, 7, 10, 4, 8, 9, 11} can be obtained.

Step 5-1: Subsequently, the searching unit 202 extracts RecNo1{5, 11, 9, 2, 0, 4, 10} that are records corresponding to RecNo2{5, 7, 10, 4, 8, 9, 11} in the records constituting the transposition block 1410 of the search target parameter y. That is, the searching unit 202 extracts the values of RecNo1 from the records of the record numbers "5", "7", "10", "4", "8", "9", and "11", respectively, and obtains RecNo1{5, 11, 9, 2, 0, 4, 10}.

Step 5-2: Because the values of RecNo1 extracted in step 5-1 above are the record numbers of the transposition block 1400 of the search target parameter x, the searching unit 202 excludes the values that are not included in the closed interval $S_0$=[0, 6] among these RecNo1 values. By this process, RecNo1{5, 2, 0, 4} can be obtained.

Step 6-1: Subsequently, the searching unit 202 extracts RecNo0{3, 7, 1, 0} that are the records corresponding to RecNo1{5, 2, 0, 4} in the records constituting the transposition block 1400 of the search target parameter x. That is, the searching unit 202 extracts the values of RecNo0 from the records of record numbers "5", "2", "0", and "4", respectively, and obtains RecNo0{3, 7, 1, 0}.

Step 6-2: Because the values of RecNo0 extracted in step 6-1 above are the record numbers of the source table 1000, the searching unit 202 identifies {0, 1, 3, 7} as the record numbers of the multidimensional data that satisfies the search condition.

Returning to FIG. 8, in step S204, the searching unit 202 of the data search device 20 outputs the records of the record numbers identified in step S203 above as a search result. That is, the searching unit 202 outputs, as the search result, the multidimensional data of the record number "0," the multidimensional data of the record number "1," the multidimensional data of the record number "3," and the multidimensional data of the record number "7" among the multidimensional data constituting the source table 1000. This allows the multidimensional data that satisfies the search condition to be output. Here, the multidimensional data may be output to the terminal device 10, but the multidimensional data may be output to another device or equipment that is different from the terminal device 10.

As described above, the data search system 1 according to the present embodiment can search for the multidimensional data that satisfies the search condition by using the multidimensional index 1600 that is created in advance. At this time, because the record numbers of the multidimensional data satisfying the search condition are sequentially narrowed by using the transposition blocks, the search can be performed efficiently without performing unnecessary search.

Here, because the data search system 1 according to the present embodiment needs to create the multidimensional index 1600 in advance before searching for the multidimensional data, the database 203 is preferably read-only or updated at relatively less frequency (for example, updates every several weeks to several months).

APPLICATION EXAMPLE

Here, some of application examples of the data search system 1 according to the present embodiment will be described.

Application Example 1

In the embodiment described above, the search condition of each search target parameter is a range of values, but is not limited thereto. In the present embodiment, it is necessary to set an "and" condition between the search target parameters, but any search condition can be specified as the search condition of each search target parameter. For example, "and", "or", "not", "all", or the like can be specified as a search condition.

Specifically, for example, for a search target parameter x, the search target parameter x can be specified as "x=all", "x=11 or 12", or "not(10≤x≤11)".

Application Example 2

In the embodiment described above, when the CPU included in the data search device 20 has a multi-core processor, step S203 described above can be processed in parallel at respective cores. This enables the search of the multidimensional data to be performed more efficiently.

For example, the closed interval $S_2$ is divided into any M closed intervals $S_{21}, \ldots, S_{2M}$, and step 4-1 to step 6-2 for the respective closed intervals $S_{21}, \ldots, S_{2M}$ can be processed in parallel by respective cores. Specifically, for example, when the CPU has three cores, step 4-1 to step 6-2 for the closed interval $S_{21}$, step 4-1 to step 6-2 for the closed interval $S_{22}$, and step 4-1 to step 6-2 for the closed interval $S_{23}$ can be respectively processed in parallel with the core 1, the core 2, and the core 3.

Additionally, for example, step-4-1 to step-4-2 above, step-5-1 to step-5-2 above, and step-6-1 to step-6-2 above can be respectively processed in parallel with three cores, by pipeline processing. Specifically, for example, the core 1 sequentially performs extraction of the values of RecNo2 in the records within the closed interval $S_2$ and exclusion of the value that is not included in the closed interval $S_1$, and sequentially passes, to the core 2, the values of RecNo2 that are not excluded. The core 2 sequentially performs extraction of the values of RecNo1 in the records corresponding to the values of RecNo2 passed from the core 1 and exclusion of the value that is not included in the closed interval $S_0$, and sequentially passes, to the core 3, the values of RecNo1 that are not excluded. The core 3 sequentially performs extraction of the values of RecNo0 corresponding to the values of RecNo1 passed from the core 2. Such pipeline processing allows the extraction and exclusion of the record numbers in each transposition block to be processed in parallel with multiple cores.

Application Example 3

This embodiment can combine or virtually combine the source tables and the multidimensional indexes of the source tables stored in the multiple databases. In other words, the source tables and the multidimensional indexes that are partitioned can be combined or virtually combined.

For example, the following description assumes that a source table 2100 and a multidimensional index 2600 of the source table 2100 illustrated in FIG. 10A and a source table 2110 and a multidimensional index 2610 of the source table 2110 illustrated in FIG. 10B are stored in two different databases. Additionally, the following description assumes that the multidimensional data constituting the source tables 2100 and 2110 includes the search target parameters (Planet, x, y, z). Here, the two databases may be included in two data search devices 20, or may be respectively included in the terminal device 10 and the data search device 20.

Here, the source table 2100 and the multidimensional index 2600 are positioned in front, the source table 2110 and the multidimensional index 2610 are positioned backward, and then the source tables are combined or virtually combined together and the multidimensional indexes are combined or virtually combined together, and a source table 3100 and a multidimensional index 3600 of the source table 3100 illustrated in FIG. 10C are obtained.

The source table 3100 illustrated in FIG. 10C is a table in which the source table 2100 and the source table 2110 are combined or virtually combined with the source table 2100 being positioned in front and the source table 2110 being positioned backward. The multidimensional data of the record numbers "0" to "11" is the multidimensional data constituting the source table 2100, and the multidimensional data of the record numbers "12" to "23" is the multidimensional data constituting the source table 2110. Here, the record numbers "12" to "23" are values obtained by adding the number of data (the number of records) of the multidimensional data constituting the source table 2100 to the record numbers of the respective multidimensional records constituting the source table 2110. When the source table 2100 and the source table 2110 are combined, the record numbers "12" to "23" are numbers actually assigned to the multidimensional data. When the source table 2100 and the source table 2110 are virtually combined, the record numbers "12" to "23" are numbers to be read from the record numbers of the multidimensional data constituting the source table 2110.

The multidimensional index 3600 illustrated in FIG. 10C is the multidimensional index in which the source table 2100 and the source table 2110 are combined or virtually combined with the source table 2100 being positioned in front and the source table 2110 being positioned backward. Here, the record numbers "12" to "23" are values obtained by adding the number of data (the number of records) of the data constituting the multidimensional index 2600 to the record numbers of the respective data constituting the multidimensional index 2610. When the source table 2100 and the source table 2110 are combined, the record numbers "12" to "23" are numbers actually assigned to the data constituting the multidimensional index 2610. When the source table 2100 and the source table 2110 are virtually combined, the record numbers "12" to "23" are numbers to be read from the record numbers of the respective data constituting the multidimensional index 2610.

As described above, in the data search system 1 according to the present embodiment, when multiple source tables are combined or virtually combined, the multidimensional indexes of the multiple source tables can also be easily combined or virtually combined. Therefore, for example, a source table having a large data size can be easily partitioned into multiple source tables or multiple source tables can be easily combined or virtually combined, thereby facilitating the operation of the data search system 1.

Application Example 4

The transposition block created in the present embodiment has the same structure as SVL, IND, and INV described in WO 2019/163610. Thus, the transposition block can be used instead of SVL, IND, and INV (or conversely, SVL, IND, and INV can be also used instead of the transposition block of the present embodiment). Therefore, as with SVL, IND, and INV described in WO 2019/163610, the transposition block is compact and enables quick search.

Application Example 5

The cache miss can be reduced by sorting (but without need of a strict sorting approach) the values of RecNo extracted from each transposition block in step S203 above.

Specifically, for example, RecNo2{5, 7, 10, 4, 8, 9, 11} obtained in step 4-2 above are sorted to obtain RecNo2{4, 5, 7, 8, 9, 10, 11}. Next, in step 5-1, after extracting RecNo1{2, 5, 11, 0, 4, 9, 10} of the records corresponding to RecNo2{4, 5, 7, 8, 9, 10, 11}, RecNo1{2, 5, 11, 0, 4, 9, 10} are sorted to obtain RecNo1{0, 2, 4, 5, 9, 10, 11}. Then, in step 5-2, values that are not included in the closed interval $S_0=[0, 6]$ are excluded from RecNo1{0, 2, 4, 5, 9, 10, 11} to obtain Rec1{0, 2, 4, 5}. Subsequently, values of RecNo extracted from the transposition block may be sorted similarly.

Here, as described above, the sort need not be strict and may be rough (i.e., there may be some numbers left that are not sorted). Rough sorting reduces sorting time and enables faster search. Specific examples of the rough sorting include a counting sort or a bucket sort in which, when one storage unit of an SSD is 4096 bytes, a 64-bit integer is used as a record number and the sort is performed by using numbers obtained by dividing the record numbers by 512, using the fact that 512 record numbers are stored in one storage unit.

The present invention is not limited to the above specifically disclosed embodiments. Various modifications, alterations, combinations with known techniques, and the like can be made without departing from the scope of the claims.

What is claimed is:

1. A search method, for execution by a computer, for searching for multidimensional data that satisfies a search condition in a table representing a multidimensional data set including a plurality of search target parameters, the search method comprising:
   creating multidimensional indexes including a plurality of transposition blocks for identifying record numbers based on values of parameters of the plurality of search target parameters by using the multidimensional data set included in the table; and
   identifying a target record number of the multidimensional data that satisfies the search condition in the multidimensional data set included in the table by using the multidimensional indexes,
   wherein the creating of the multidimensional indexes includes creating each of the plurality of transposition blocks by sorting values of a corresponding parameter among the plurality of search target parameters.

2. The search method as claimed in claim 1,
   wherein the creating of the multidimensional indexes includes
   creating a transposition block for identifying a record number of a previous transposition block or a record number of the table, for each of the plurality of search target parameters in a predetermined order, based on values of the search target parameter, and
   creating the multidimensional indexes including the transposition block created for each of the plurality of search target parameters.

3. The search method as claimed in claim 2,
   wherein the creating of the multidimensional indexes includes creating the transposition block for identifying the record number of the previous transposition block or the record number of the table based on the values of the search target parameter by accessing the values of the search target parameter in ascending order or in descending order.

4. The search method as claimed in claim 2,
   wherein the identifying of the target record number includes identifying the target record number of the multidimensional data that satisfies the search condition by using the plurality of transposition blocks included in the multidimensional indexes in a reverse order of the predetermined order.

5. The search method as claimed in claim 4,
   wherein a range of possible values of at least one search target parameter among the plurality of search target parameters is specified as the search condition, and
   wherein the identifying of the target record number includes
   identifying the target record number of the multidimensional data that satisfies the search condition by identifying a range of record numbers corresponding to the range of the possible values of the at least one search target parameter specified as the search condition by using each of the plurality of transposition blocks in the reverse order of the predetermined order, and
   excluding a record number that is not included in the identified range among record numbers identified by using the previous transposition block.

6. The search method as claimed in claim 5, wherein the identifying of the target record number includes dividing the range of the record numbers into a plurality of ranges, and performing the identifying of the record numbers by using the previous transposition block and the excluding of the record number that is not included in the identified range with respect to the plurality of divided ranges in parallel.

7. The search method as claimed in claim 5,
   wherein the identifying of the target record number includes performing the identifying of the record numbers by using each of the plurality of transposition blocks and the excluding of the record number that is not included in the identified range in parallel by pipeline processing.

8. A search device for searching for multidimensional data that satisfies a search condition in a table representing a multidimensional data set including a plurality of search target parameters, the search device comprising:
   a processor; and
   a memory storing program instructions that cause the processor to:
   create multidimensional indexes including a plurality of transposition blocks for identifying record numbers based on values of parameters of the plurality of search target parameters by using the multidimensional data set included in the table; and
   identify a target record number of the multidimensional data that satisfies the search condition in the multidimensional data set included in the table by using the multidimensional indexes,
   wherein the creating of the multidimensional indexes includes creating each of the plurality of transposition blocks by sorting values of a corresponding parameter among the plurality of search target parameters.

9. A search method, for execution by a computer, for searching for multidimensional data that satisfies a search condition in a table representing a multidimensional data set including a plurality of search target parameters, the search method comprising:
   creating multidimensional indexes including a plurality of transposition blocks for identifying record numbers based on values of parameters of the plurality of search target parameters by using the multidimensional data set included in the table; and
   identifying a target record number of the multidimensional data that satisfies the search condition in the multidimensional data set included in the table by using the multidimensional indexes, wherein the creating of the multidimensional indexes includes creating a transposition block for identifying a record number of a previous transposition block or a record number of the table, for each of the plurality of search target parameters in a predetermined order, based on values of the search target parameter, and creating the multidimensional indexes including the transposition block created for each of the plurality of search target parameters.

* * * * *